(12) United States Patent
Cheng et al.

(10) Patent No.: US 11,354,893 B2
(45) Date of Patent: Jun. 7, 2022

(54) METHOD AND APPARATUS FOR GENERATING ROAD MAP, ELECTRONIC DEVICE, AND COMPUTER STORAGE MEDIUM

(71) Applicant: Beijing SenseTime Technology Development Co., Ltd., Beijing (CN)

(72) Inventors: Guangliang Cheng, Beijing (CN); Jianping Shi, Beijing (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 447 days.

(21) Appl. No.: 16/655,336

(22) Filed: Oct. 17, 2019

(65) Prior Publication Data

US 2020/0050854 A1 Feb. 13, 2020

Related U.S. Application Data

(63) Continuation of application No. PCT/CN2018/096332, filed on Jul. 19, 2018.

(30) Foreign Application Priority Data

Sep. 19, 2017 (CN) .......................... 201710848159.2

(51) Int. Cl.
 *G06K 9/00* (2022.01)
 *G06V 20/10* (2022.01)
 (Continued)

(52) U.S. Cl.
 CPC ........... *G06V 20/182* (2022.01); *G01C 21/32* (2013.01); *G06F 17/18* (2013.01); *G06N 3/0454* (2013.01); *G06N 3/0472* (2013.01); *G06N 3/08* (2013.01)

(58) Field of Classification Search
 CPC .. G06V 20/182; G01C 21/32; G01C 21/3822; G01C 21/3852; G06F 17/18; G06F 16/29;
 (Continued)

(56) References Cited

U.S. PATENT DOCUMENTS 9,037,519 B2 * 5/2015 Han ..................... G06N 3/0454
 706/12
9,317,779 B2 4/2016 Lillywhite et al.
 (Continued)

FOREIGN PATENT DOCUMENTS

CN 103310443 A 9/2013
CN 104915636 A 9/2015
 (Continued)

OTHER PUBLICATIONS

Jingchao Yang; "The Research on Auxiliary Driving Complex Road Scene Classification Based on Single Image" Chinese Excellent Master's Thesis full-text Database Information Technology Series (monthly); Feb. 15, 2017.
 (Continued)

*Primary Examiner* — Mahendra R Patel
(74) *Attorney, Agent, or Firm* — Syncoda LLC; Feng Ma

(57) ABSTRACT

Method and apparatus for generating a road map, electronic device, and non-transitory computer storage medium are disclosed, including: inputting a remote sensing image into a first neural network to extract first road feature information of multiple channels via the first neural network; inputting the first road feature information of multiple channels into a third neural network, to extract third road feature information of multiple channels via the third neural network, where the third neural network is a neural network trained by using road direction information as supervision information; fus-
 (Continued)

ing the first road feature information and the third road feature information; and generating a road map according to a fusion result.

18 Claims, 9 Drawing Sheets

(51) Int. Cl.
  *G01C 21/32* (2006.01)
  *G06F 17/18* (2006.01)
  *G06N 3/04* (2006.01)
  *G06N 3/08* (2006.01)

(58) Field of Classification Search
  CPC ...... G06N 3/0454; G06N 3/0472; G06N 3/08;
  G06N 7/005; G06N 20/00; G06N 3/02;
  G06K 9/6292; G06T 11/20
  USPC .......................................................... 382/100
  See application file for complete search history.

(56) References Cited

U.S. PATENT DOCUMENTS

| | | | | |
|---|---|---|---|---|
| 2007/0014488 A1* | 1/2007 | Chen | ......................... | G06T 7/33 |
| | | | | 382/294 |
| 2010/0070238 A1* | 3/2010 | Phelps | ..................... | F41G 7/30 |
| | | | | 702/181 |
| 2011/0160987 A1* | 6/2011 | Wu | ..................... | G08G 1/0104 |
| | | | | 382/113 |
| 2011/0280453 A1* | 11/2011 | Chen | ......................... | G06T 7/75 |
| | | | | 382/113 |
| 2012/0253661 A1* | 10/2012 | Tuukkanen | ........ | G01C 21/3415 |
| | | | | 701/426 |
| 2013/0266214 A1* | 10/2013 | Lillywhite | .......... | G06K 9/6217 |
| | | | | 382/156 |
| 2014/0196529 A1* | 7/2014 | Cronin | .................... | E01C 23/06 |
| | | | | 73/146 |
| 2016/0239983 A1* | 8/2016 | Dorum | ................... | G01C 11/04 |
| 2016/0371977 A1* | 12/2016 | Wingate | ........... | G08G 1/096866 |
| 2016/0379388 A1* | 12/2016 | Rasco | .................... | G06N 5/003 |
| | | | | 715/753 |
| 2017/0053155 A1* | 2/2017 | Campbell | ............ | G06V 20/182 |
| 2017/0140245 A1* | 5/2017 | Kraft | .................... | G06K 9/6234 |
| 2017/0282869 A1* | 10/2017 | Tong | ......................... | B60T 7/22 |
| 2017/0300763 A1* | 10/2017 | Zou | ......................... | G06V 10/82 |
| 2019/0008437 A1* | 1/2019 | Ben-Ezra | ........... | A61B 5/14551 |
| 2019/0026597 A1* | 1/2019 | Zeng | .................... | G06K 9/6277 |

FOREIGN PATENT DOCUMENTS

| | | |
|---|---|---|
| CN | 105184270 A | 12/2015 |
| CN | 106874894 A | 6/2017 |
| CN | 106909886 A | 6/2017 |
| CN | 107025440 A | 8/2017 |
| CN | 108230421 A | 6/2018 |
| EP | 3171292 A1 | 5/2017 |
| JP | 2009230518 A | 10/2009 |

OTHER PUBLICATIONS

Yang Hu et al. "Improved Ribbon Snake algorithm for automatic road generation"; Computer Application; Mar. 31, 2009.
Guangliang Cheng et al. "Recognizing road from statellite images by structured neural network"; 2019.
International Search Report in the international application No. PCT/CN2018/096332, dated Oct. 18, 2018.
First Office Action of the Chinese application No. 201710848159.2, dated Dec. 16, 2019.
Shunta Saito, Building and Road Detection from Aerial Images using The Convolutional Neural Network, The 22nd Image Sensing Symposium SSII2016 [USB] The 22nd Symposium on Sensing via Image Information, Japan, Image Sensing Technology Research Group.
First Office Action of the Japanese application No. 2019-558374, dated Dec. 22, 2020.
English translation of the Written Opinion of the International Search Authority in the international application No. PCT/CN2018/096332, dated Oct. 18, 2018.

* cited by examiner

METHOD AND APPARATUS FOR GENERATING ROAD MAP, ELECTRONIC DEVICE, AND COMPUTER STORAGE MEDIUM

CROSS-REFERENCE TO RELATED APPLICATIONS

The present application is a continuation of International Application No. PCT/CN2018/096332 filed on Jul. 19, 2018, which claims priority to Chinese Patent Application No. CN201710848159.2 filed on Sep. 19, 2017 and entitled "METHOD AND APPARATUS FOR GENERATING ROAD MAP, ELECTRONIC DEVICE, AND COMPUTER STORAGE MEDIUM", the contents of which are incorporated herein by reference in their entirety.

TECHNICAL FIELD

The present disclosure relates to the technical field of image processing, and particularly relates to a method and an apparatus for generating a road map, an electronic device, and a non-transitory computer storage medium.

BACKGROUND

With the development of science and technology and the progress of society, maps play an increasingly important role in people's travel. Maps enable people to determine their location information or destination location information at any time, which is conducive to travel planning and improves the convenience of people's lives.

With the popularization of intelligent terminals, electronic maps have become commonly used applications of the intelligent terminals. In order to improve the accuracy of the electronic map, it is necessary to obtain an actual map image, and then find road information from the map image. Computer vision and image processing technologies, such as support vector machines, random forests and the like, have important applications in road image recognition.

SUMMARY

Embodiments of the present disclosure provide technical solutions for generating a road map.

According to one aspect of the embodiments of the present disclosure, provided is a method for generating a road map. The method includes: inputting a remote sensing image into a first neural network to extract first road feature information of multiple channels via the first neural network; inputting the first road feature information of multiple channels into a third neural network to extract third road feature information of multiple channels via the third neural network, where the third neural network is a neural network trained by using road direction information as supervision information; fusing the first road feature information and the third road feature information; and generating a road map according to a fusion result.

According to another aspect of the embodiments of the present disclosure, provided is an apparatus for generating a road map. The apparatus includes: a first road feature information acquisition unit, configured to input a remote sensing image into a first neural network, to extract first road feature information of multiple channels via the first neural network; a third road feature information acquisition unit, configured to input the first road feature information of multiple channels into a third neural network, to extract third road feature information of multiple channels via the third neural network, where the third neural network is a neural network trained by using road direction information as supervision information; an information fusion unit, configured to fuse the first road feature information and the third road feature information; and a road map generation unit, configured to generate a road map according to a fusion result.

According to still another aspect of the embodiments of the present disclosure, provided is an electronic device, including: a memory, configured to store executable instructions; and a processor, configured to communicate with the memory to execute the executable instructions so as to complete operations of the method for generating a road map according to any one of the foregoing embodiments of the present disclosure.

According to yet another aspect of the embodiments of the present disclosure, provided is a non-transitory computer storage medium, having stored thereon computer-readable instructions that, when being executed by a processor, cause the processor to execute the operations of the method for generating a road map according to any one of the foregoing embodiments of the present disclosure.

According to the method for generating a road map and apparatus, the electronic device, and the non-transitory computer storage medium provided by the embodiments of the present disclosure, a remote sensing image is input into a first neural network to obtain first road feature information of multiple channels; then, the first road feature information of multiple channels is input into a third neural network to obtain third road feature information of multiple channels, where the third neural network is a neural network trained by using road direction information as supervision information; and afterwards, the first road feature information and the third road feature information are fused, and a road map is generated according to a fusion result, so that the accuracy of extracting road direction features of the remote sensing image is improved.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions.

According to the following detailed description, the present disclosure can be understood more clearly with reference to the accompanying drawings.

Figure 1:
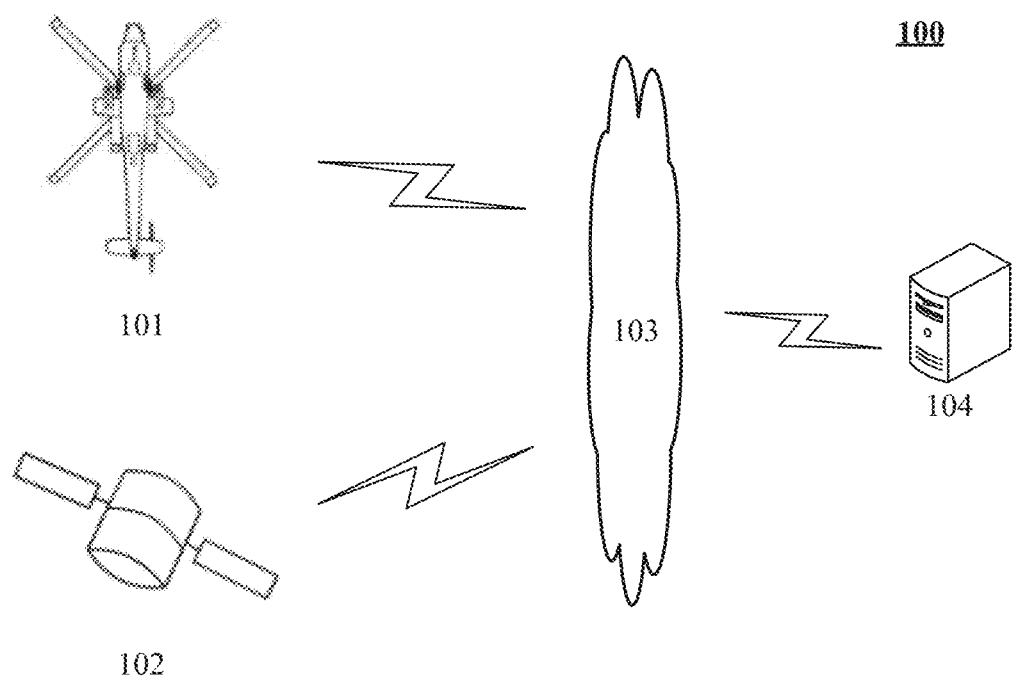
Figure 2:
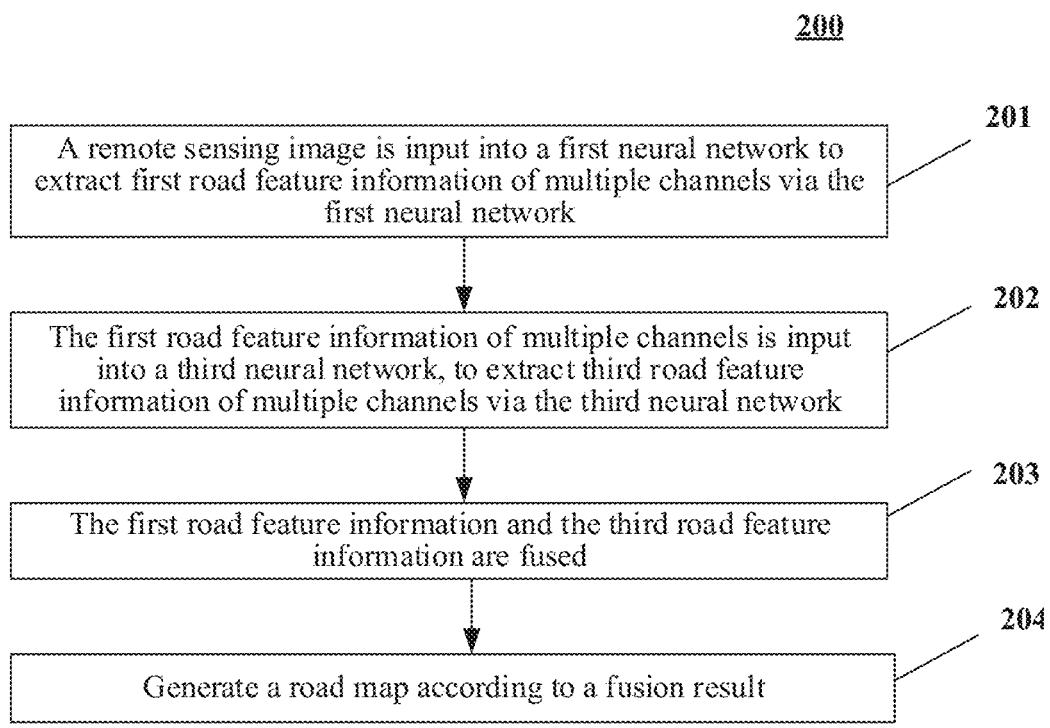
Figure 3:
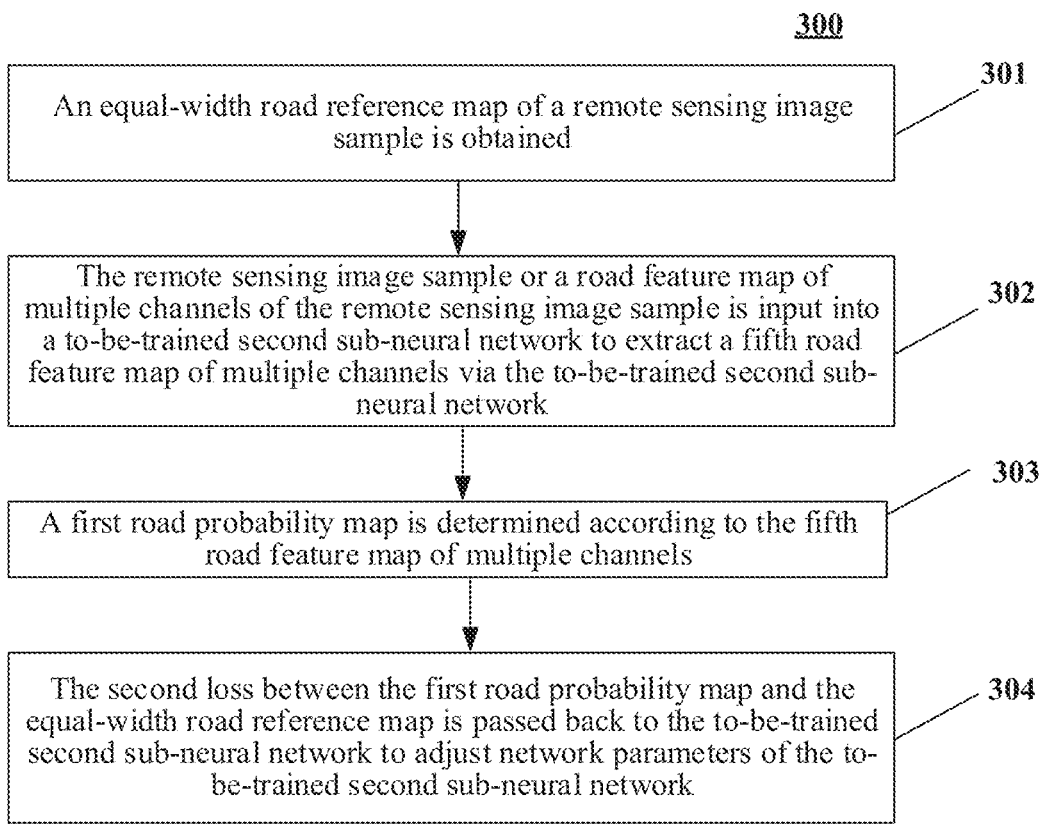
Figure 4:
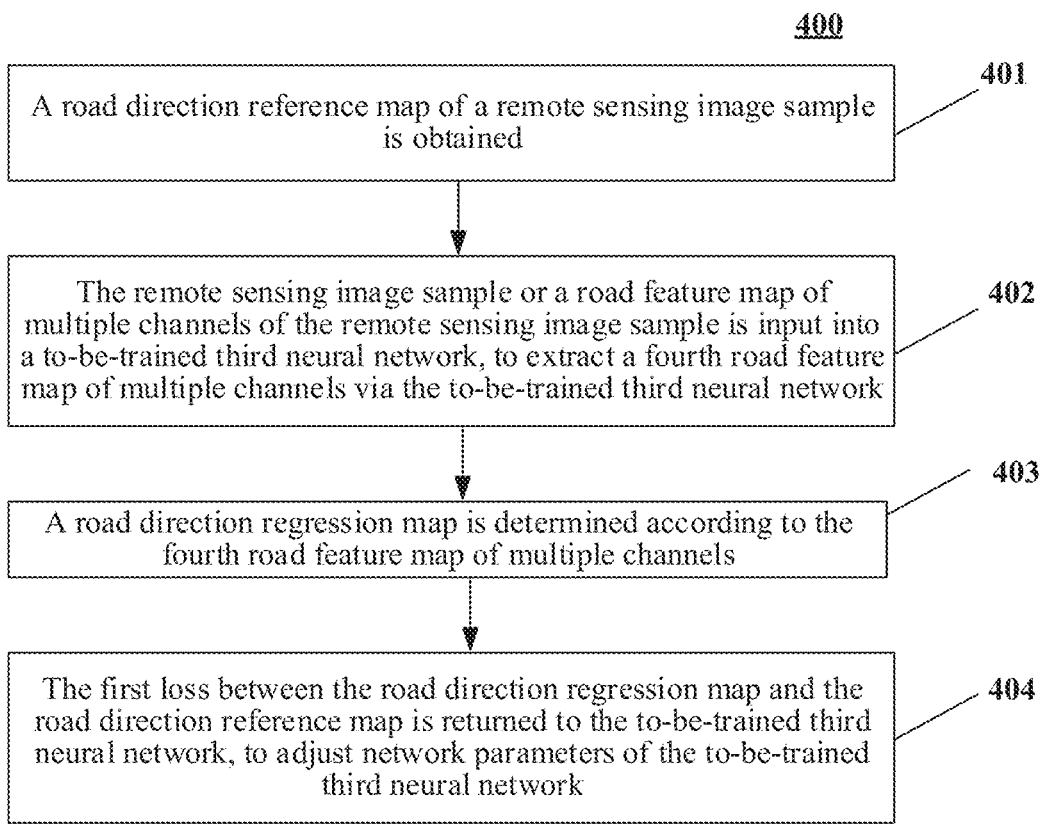
Figure 5:
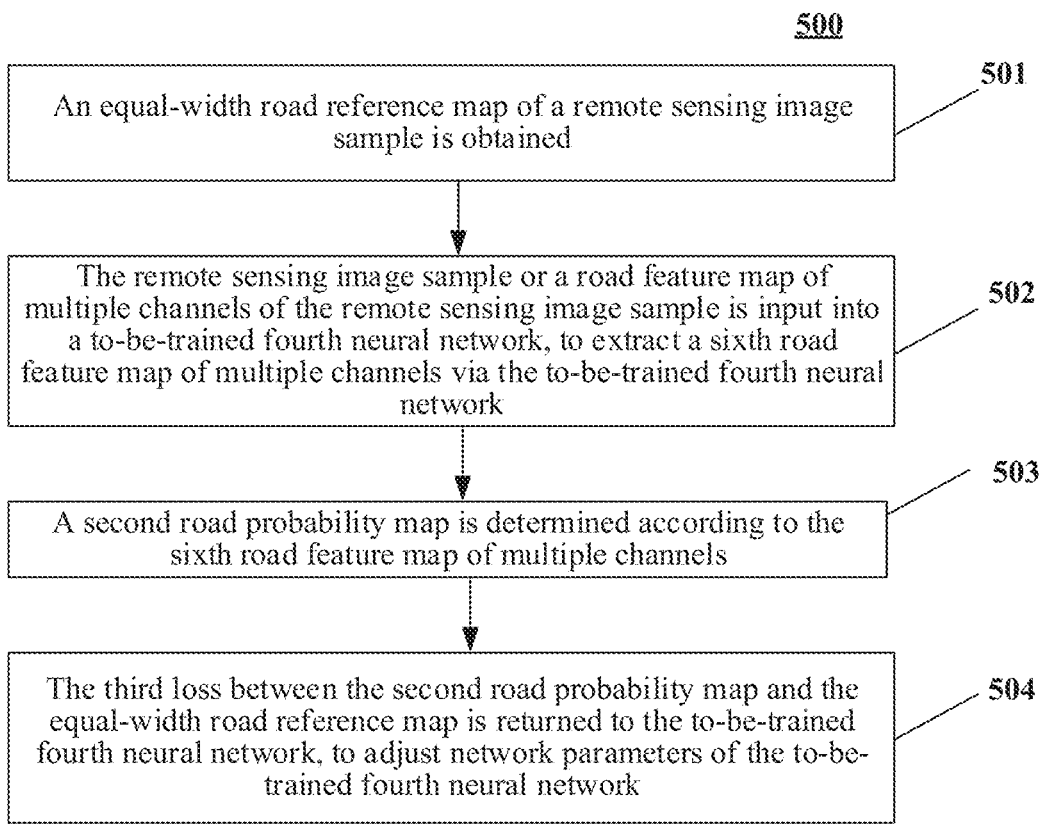
Figure 6A:
Figure 6B:
Figure 7:
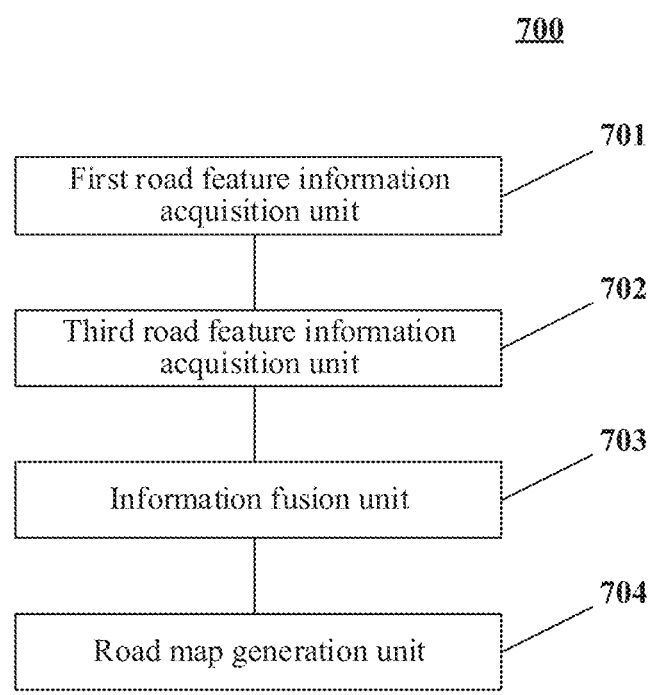
Figure 8:
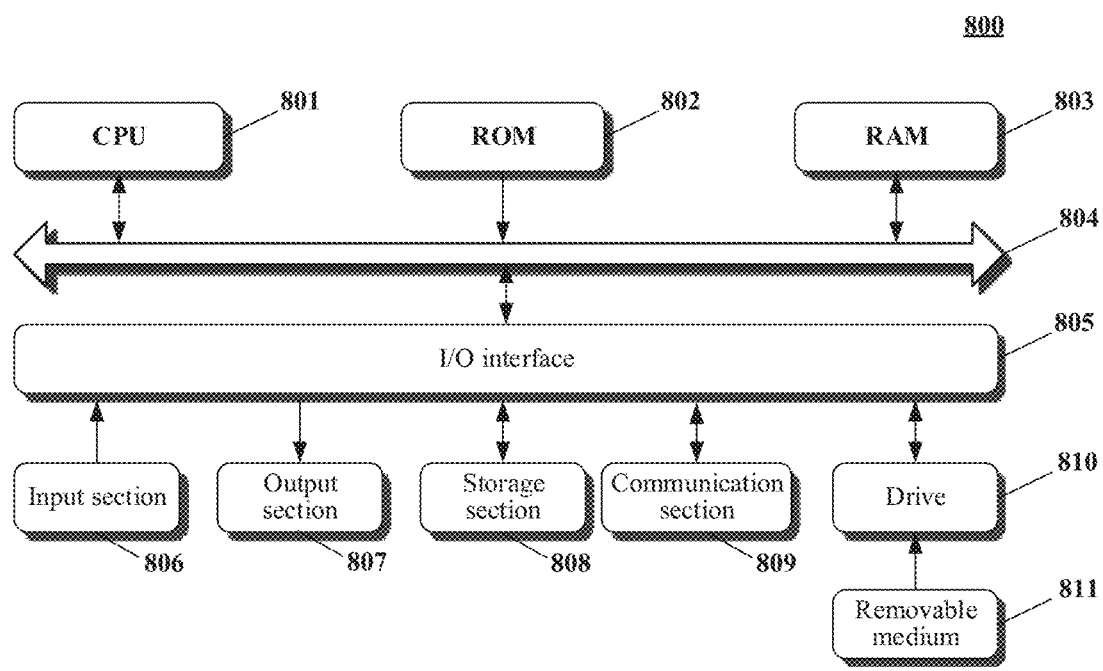

Other features, objectives, and advantages of the embodiments of the present disclosure will become more apparent by reading the detailed description of non-limiting embodiments made with reference to the following accompanying drawings:

FIG. 1 is a diagram of an exemplary system architecture to which the embodiments of the present disclosure is applicable;

FIG. 2 is a flowchart of a method for generating a road map according to embodiments of the present disclosure;

FIG. 3 is a flowchart of a method for training a second sub-neural network according to embodiments of the present disclosure;

FIG. 4 is a flowchart of a method for training a third neural network according to embodiments of the present disclosure;

FIG. 5 is a flowchart of a method for training a fourth sub-neural network according to embodiments of the present disclosure;

FIG. 6a is a schematic diagram of an application scenario of a method for generating a road map according to embodiments of the present disclosure;

FIG. 6b is a road map obtained after extracting road features in FIG. 6a;

FIG. 7 is a schematic structural diagram of an apparatus for generating a road map according to embodiments of the present disclosure; and FIG. 8 is a schematic structural diagram of a server according to embodiments of the present disclosure.

DETAILED DESCRIPTION

The present disclosure is further described in detail below with reference to the accompanying drawings and the embodiments. It can be understood that the optional embodiments described here are only used for explaining the related invention, but are not intended to limit the present disclosure. Moreover, it should also be notated that, for ease of description, the accompanying drawings illustrate only the parts related to the relevant invention.

It should be noted that, unless otherwise stated specifically, relative arrangement of the components and steps, the numerical expressions, and the values set forth in the embodiments are not intended to limit the scope of the present disclosure.

In addition, it should be understood that, for ease of description, the size of each part shown in the accompanying drawings is not drawn in actual proportion.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

A person skilled in the art may understand that the terms such as "first" and "second" in the embodiments of the present disclosure are only used to distinguish different steps, devices or modules, etc., and do not represent any specific technical meaning or an inevitable logical sequence therebetween.

It should be noted that the embodiments in the present disclosure and the features in the embodiments may be combined with each other in the case of no conflict.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the systems, and the like.

The electronic devices such as terminal devices, computer systems, and servers may be described in the general context of computer system executable instructions (such as, program modules) executed by the computer systems. Generally, the program modules may include routines, programs, target programs, assemblies, logics, data structures, and the like, to perform specific tasks or implement specific abstract data types. The computer systems/servers may be practiced in the distributed cloud computing environments in which tasks are executed by remote processing devices that are linked through a communications network. In the distributed computing environments, program modules may be located in local or remote computing system storage media including storage devices.

The following describes the embodiments of the present disclosure in detail with reference to the accompanying drawings in conjunction with the embodiments. FIG. 1 shows an exemplary system architecture 100 to which the method for generating a road map and an apparatus for generating a road map of the embodiments of the present disclosure are applicable.

As shown in FIG. 1, the system architecture 100 includes a terminal device 101 (e.g., an aerial photographing object, etc.), a terminal device 102 (e.g., a satellite, etc.), a network 103, and an electronic device 104. The network 103 is configured to provide a medium for a communication link among the terminal device 101, the terminal device 102 and the electronic device 104. The network 103 includes various types of connections, such as wired communication links, wireless communication links, or optical fiber cables.

A user may interact with the electronic device 104 through the network 103 by using the terminal devices 101 and 102 to receive or transmit image information and the like. The terminal devices 101 and 102 are carriers for carrying sensors. Balloons, aerial photographing objects, artificial satellites and the like, are commonly used to obtain electromagnetic wave characteristics of a target object from a long distance, and through transmission, storage and correction of the image information and recognition of the target object, the function thereof is finally achieved (such as, a timing function, a positioning function, a qualitative function, or a quantitative function). The sensor, for example, may be an instrument device for detecting electromagnetic wave characteristics of a target object, and a camera, a scanner, an imaging radar and the like are commonly used.

The electronic device 104 may be a server for providing various services, such as a background image processing server for obtaining remote sensing images from sensors mounted on terminal devices 101 and 102. The background image processing server may process, such as analyze, data such as the received remote sensing images, and output the processing result (such as an object detection result).

It should be noted that the method for generating a road map provided by the embodiments of the present disclosure may be executed by the electronic device 104. Accordingly, the apparatus for generating a road map may be provided in the server 104.

It should be understood that the number of the terminal devices, the networks, and the electronic devices in FIG. 1 are merely illustrative. According to implementation needs, there may be any number of terminal devices, networks, and electronic devices.

Referring to FIG. 2, a flowchart 200 of a method for generating a road map according to embodiments of the present disclosure is shown. The method for generating a road map includes the following operations.

At block 201, a remote sensing image is input into a first neural network to extract first road feature information of multiple channels via the first neural network.

In the embodiments, the electronic device used for implementing the embodiments (such as the electronic device 104 shown in FIG. 1) may receive remote sensing images sent by terminal devices 101 and 102 in a wired or wireless manner, and process the remote sensing images to obtain the first road feature information. It should be noted that the wireless connection mode, for example, may include, but is not limited to, a 3G/4G connection, a WiFi connection, a Bluetooth connection, a wireless metropolitan area network (WiMAX) connection, a wireless personal area network (Zigbee) connection, an ultra wideband (UWB) connection, other wireless connections that are now known or developed in the future or the like.

After obtaining the remote sensing image comprising multiple channels, the remote sensing image is imported into the first neural network, and the first neural network is capable of extracting the first road feature information of multiple channels from the remote sensing image. The first road feature information may be, for example, road feature information including a road width extracted from the remote sensing image.

In some optional implementations of the embodiments, the first neural network includes: a second sub-neural network, where the second sub-neural network may be a neural network trained by using allowable road width information as supervision information. Accordingly, in this implementation, the inputting a remote sensing image into a first neural network to extract first road feature information of multiple channels via the first neural network includes: inputting the remote sensing image into the second sub-neural network, to extract a second road feature map (Feature-map) of multiple channels via the second sub-neural network. Accordingly, in this implementation, the first road feature information includes the second road feature map.

Based on this implementation, after obtaining the remote sensing image, the remote sensing image may be directly input into the second sub-neural network. The second sub-neural network is a neural network trained by using allowable road width information as supervision information, and the second sub-neural network may identify the road image in the remote sensing image, and extract the second road feature map of multiple channels including an allowable width from the remote sensing image. Exemplarily, the second sub-neural network includes multiple convolution layers, and each convolution layer may be followed by a normalization layer and a non-linear layer which are connected thereto in series, and finally outputs the second road feature map of multiple channels after a classification layer having a convolution kernel of a set size is connected thereto.

In other optional implementations of the embodiments, the first neural network includes: a first sub-neural network and a second sub-neural network. Accordingly, in this implementation, the inputting a remote sensing image into a first neural network, to extract first road feature information of multiple channels via the first neural network includes: inputting the remote sensing image into the first sub-neural network, to extract a first road feature map of multiple channels via the first sub-neural network; and inputting the first road feature map of multiple channels into the second sub-neural network, to extract the second road feature map of multiple channels via the second sub-neural network, where the second sub-neural network is a neural network trained by using allowable road width information as supervision information. Accordingly, in this implementation, the first road feature information includes the second road feature map.

In this implementation, the first neural network may include: a first sub-neural network and a second sub-neural network. In order to speed up the data processing of the remote sensing image, the size of the remote sensing image may be reduced by the first sub-neural network. The first sub-neural network may extract the first road feature map of multiple channels from the remote sensing image by means of, for example, convolution and down-sampling. The first road feature map is then input to a second sub-neural network to obtain the second road feature map of multiple channels including the allowable width.

In still other optional implementations of the embodiments, the first neural network includes: a first sub-neural network, a second sub-neural network, and a third sub-neural network. Accordingly, in this implementation, the inputting a remote sensing image into a first neural network, to extract first road feature information of multiple channels via the first neural network includes: inputting the remote sensing image into the first sub-neural network, to extract a first road feature map of multiple channels via the first sub-neural network, inputting the first road feature map of multiple channels into the second sub-neural network, to extract a second road feature map of multiple channels via the second sub-neural network, where the second sub-neural network is a neural network trained by using allowable road width information as supervision information; and inputting the second road feature map of multiple channels into the third sub-neural network, to extract a third road feature map of multiple channels via the third sub-neural network. The first road feature information includes the third road feature map.

In this implementation, the first neural network includes: a first sub-neural network, a second sub-neural network, and a third sub-neural network. The first sub-neural network and the second sub-neural network may be the same as those described in the above implementation. After obtaining the second road feature map of multiple channels, the second road feature map of multiple channels may be input to the third sub-neural network, and a third road feature map of multiple channels is output after the second road feature map of multiple channels is de-noised by the third sub-neural network. With the embodiments, an equal-width smooth road may be obtained, and a burr phenomenon occurring in the extracted road feature map due to reasons of the remote sensing image such as obstacle obstruction, image sharpness, extraction precision and the like may be improved.

In some optional implementations of the embodiments, the allowable road width information may be an allowable road width range, and the width of at least one road (for example, each road) in the road map falls into the allowable road width range; alternatively, the allowable road width information may be a predetermined road width, and the width of at least one road (for example, each road) in the road map is the predetermined road width.

In the embodiments of the present disclosure, the remote sensing images may be captured at different heights. To obtain a more accurate road map, an allowable road width range may be set, and the widths of some or all of the roads in the road map fall into the allowable road width range, so as to accord with the actual road width to the greatest extent. Furthermore, the road width may be set as a predetermined road width such that the widths of some or all of the roads in the road map are the predetermined road width.

In some optional implementations of the embodiments, as shown in FIG. 3, a flowchart 300 of a method for training the second sub-neural network is provided, for example, the method includes the following operations.

At block 301, an equal-width road reference map (groundtruth) of a remote sensing image sample (i.e., a remote sensing image for training) is obtained.

In order to extract the features of the equal-width road through the second sub-neural network, it is necessary to first obtain the equal-width road reference map of the remote sensing image sample, and the equal-width road reference map may be obtained in advance by manual labeling, machine labeling or other methods. The equal-width road reference map may be a remote sensing image pre-labeled with an equal-width road, and is used as supervision information in the process of training the second sub-neural network.

At block 302, the remote sensing image sample or a road feature map of multiple channels of the remote sensing image sample is input into a to-be-trained second sub-neural network, to extract a fifth road feature map of multiple channels via the to-be-trained second sub-neural network.

The training data of the second sub-neural network may be the remote sensing image sample or the road feature map of multiple channels extracted from the remote sensing image sample. After the training data is input into the to-be-trained second sub-neural network, the to-be-trained second sub-neural network may extract corresponding road width feature information from the training data such as the remote sensing image sample for training or the road feature map of multiple channels of the remote sensing image sample, and obtains a corresponding fifth road feature map of multiple channels.

At block 303, a first road probability map is determined according to the fifth road feature map of multiple channels.

After obtaining the fifth road feature map, image processing is performed on the fifth road feature map to determine the first road probability map. The first road probability map is used for representing a probability of at least one pixel point (for example, each pixel point) in the fifth road feature map belonging to the road. Optionally, after determining the first road probability map, normalization processing is performed on the first road probability map, and subsequent processing is then performed.

At block 304, the second loss between the first road probability map and the equal-width road reference map is passed back to the to-be-trained second sub-neural network to adjust network parameters of the to-be-trained second sub-neural network.

The equal-width road reference map may be considered to be an effect map in an ideal state. Usually, there is an error between the first road probability map and the equal-width road reference map, and this error may be regarded as the second loss. By passing the second loss back to the to-be-trained second sub-neural network, the network parameters of the to-be-trained second sub-neural network are adjusted to reduce the second loss, thereby improving the accuracy of extracting the equal-width read features by the to-be-trained second sub-neural network.

In an optional example, block 201 is performed by a processor by invoking a corresponding instruction stored in a memory, or is performed by a first road feature information acquisition unit 701 run by the processor.

At block 202, the first road feature information of multiple channels is input into a third neural network, to extract third road feature information of multiple channels via the third neural network.

After obtaining the first road feature information, the first road feature information is input to the third neural network so as to obtain third road feature information. The third road feature information may be feature information obtained by adding direction information of the road on the basis of the first road feature information. The third neural network is a neural network trained by using at least road direction information as supervision information In some optional implementations of the embodiments, as shown in FIG. 4, a flowchart 400 of a method for training the third neural network is also provided, for example, the method includes the following operations.

At block 401, a road direction reference map (i.e., groundtruth) of a remote sensing image sample is obtained.

In order to extract the directional features of the road through the third neural network, it is necessary to obtain a road direction reference map of the remote sensing image firstly. The road direction reference map may be a remote sensing image pre-marked with a road direction, and the pre-marking approach may be a manual marking, a machine marking, or other methods.

At block 402, the remote sensing image sample or a road feature map of multiple channels of the remote sensing image sample is input into a to-be-trained third neural network, to extract a fourth road feature map of multiple channels via the to-be-trained third neural network.

The training data of the third neural network may be the remote sensing image sample or the road feature map of multiple channels extracted from the remote sensing image sample. After the training data is input into a to-be-trained third neural network, the to-be-trained third neural network may extract corresponding direction feature information from the remote sensing image sample for training or the road feature map of multiple channels of the remote sensing image sample, and obtain a corresponding fourth road feature map of multiple channels.

At block 403, a road direction regression map is determined according to the fourth road feature map of multiple channels.

After obtaining the fourth road feature map, image processing may be performed on the fourth road feature map, to determine the road direction regression map. The road direction regression map is used for representing the value of a corresponding pixel of the feature map of multiple channels, and subsequent processing may be performed on said map directly without performing normalization processing. Optionally, the value of a single pixel in the road direction regression map may be a certain number from 0-180, indicating an offset angle of the road direction of the pixel relative to the reference direction.

At block 404, the first loss between the road direction regression map and the road direction reference map is returned to the to-be-trained third neural network, to adjust network parameters of the to-be-trained third neural network.

The road direction reference map is an effect diagram of the road direction in an ideal state. Usually, there is an error between the road direction regression map and the road direction reference map, and this error may be considered as the first loss. By returning the first loss to the to-be-trained third neural network, the network parameters of the to-be-trained third neural network may be adjusted to reduce the first loss, thereby improving the accuracy of extracting the road direction features by the to-be-trained third neural network.

In an optional example, block 202 may be performed by a processor by invoking a corresponding instruction stored in a memory, or may be performed by a third road feature information acquisition unit 702 run by the processor.

At block 203, the first road feature information and the third road feature information are fused.

The first road feature information may be road feature information of a certain road width extracted from the remote sensing image. The third road feature information may be obtained by adding the feature information of the direction information of the road, on the basis of the first road feature information. By fusing the first road feature information and the third road feature information, the road feature information may have both the road width feature and the direction feature of the road.

In some optional implementations of the embodiments, the fusing the first road feature information and the third road feature information includes: performing addition or weighted addition on the first road feature information and the third road feature information; or concatenating the first road feature information and the third road feature information.

From the above description, it may be known that the first road feature information may be road feature information of a certain road width extracted from the remote sensing image. Therefore, the first road feature information may be an image including a certain road width. Similarly, the third road feature information may be an image including the direction information of the road. The fusion of the first road feature information and the third road feature information may be implemented by directly combining (adding), or combining according to a certain weight (weighting), pixels in the image corresponded to the first road feature information and pixels in the image corresponded to the third road feature information. Alternatively, the fusion of the first road feature information and the third road feature information may be also implemented by directly concatenating the image corresponded to the first road feature information with the image corresponded to the third road feature information, on the basis of the first road feature information.

In an optional example, block 203 may be executed by a processor by invoking a corresponding instruction stored in a memory, or may be executed by an information fusion unit 703 run by the processor.

At block 204, a road map is generated according to a fusion result.

After the first road feature information and the third road feature information are fused, the road feature information may have both the road width feature and the direction feature of the road. The road map may be generated based on the road width feature and the direction feature of the road.

In some optional implementations of the embodiments, the generating a road map according to a fusion result includes: inputting the fusion result into a fourth neural network, to extract fourth road feature information of multiple channels via the fourth neural network; and determining the road map based on the fourth road feature information of multiple channels.

The fusion result of the first road feature information and the third road feature information is input into the fourth neural network, the road width feature and the direction feature of the road are combined together by the fourth neural network to obtain the fourth road feature information of multiple channels, and the road map is determined according to the fourth road feature information of multiple channels. The fourth neural network is a neural network trained by using allowable road width information as supervision information.

In order to achieve automatic driving control or assisted driving control such as navigation, steering, and channel keeping, after obtaining the road map via the fourth neural network, the method further includes: determining a centerline of a road in the road map. The precision of the automatic driving control or assisted driving control such as navigation, steering, and channel keeping may be improved through the centerline. The phenomena, such as burrs and smoothness insufficiency, which is caused by poor extraction effect of the extracted centerline at the road intersection due to obstacle obstruction during the acquisition of the image of the road intersection, image sharpness, extraction precision of the remote sensing image and the like, may occur by using the existing method. On the basis of the road feature and the road direction in the embodiment, a smooth centerline may be extracted, and the phenomena such as burrs and smoothness insufficiency, which is caused by poor extraction effect of the extracted centerline at the road intersection due to obstacle obstruction during the acquisition of the image of the road intersection, image sharpness, extraction precision of the remote sensing image and the like, may be reduced.

In order to achieve automatic driving control or assisted driving control such as navigation, steering, and channel keeping, it is necessary to read the data of the road map. To this end, after obtaining the road map via the fourth neural network, the method further includes: vectorizing the road map to obtain a road vector map. A control instruction for automatic driving control or assisted driving control such as navigation, steering, and channel keeping may be generated by means of the road vector map.

In addition, when there are road occlusion situations in the remote sensing image, the obscured road may be supplemented according to information such as the road width feature and the road direction feature, so as to improve the accuracy of the road in the road map.

In some optional implementations of the embodiments, as shown in FIG. 5, a flowchart 500 of a method for training the fourth neural network may be also provided, for example, the method includes the following operations.

At block 501, an equal-width road reference map of a remote sensing image sample (i.e., a remote sensing image for training) is obtained.

At block 502, the remote sensing image sample or a road feature map of multiple channels of the remote sensing image sample is input into a to-be-trained fourth neural network, to extract a sixth road feature map of multiple channels via the to-be-trained fourth neural network.

At block 503, a second road probability map is determined according to the sixth road feature map of multiple channels.

At block 504, the third loss between the second road probability map and the equal-width road reference map is returned to the to-be-trained fourth neural network, to adjust network parameters of the to-be-trained fourth neural network.

The training process of the fourth neural network is similar to the training process of the second sub-neural network, and the related indications may be referred to each other, and will not be repeated here.

In some optional implementations of the embodiments, in the training process, the first loss, the second loss, and the third loss may be separately returned to a neural network system including the third neural network, the second sub-neural network, and the fourth neural network, to jointly adjust network parameters of the neural network system, for example, the following operations are included:

obtaining an equal-width road reference map and a road direction reference map of a remote sensing image sample; inputting the remote sensing image sample or a road feature map of multiple channels of the remote sensing image sample into a to-be-trained second sub-neural network, to extract a fifth road feature map of multiple channels via the to-be-trained second sub-neural network; and determining a first road probability map according to the fifth road feature map of multiple channels;

inputting the remote sensing image sample or the road feature map of multiple channels of the remote sensing image sample into a to-be-trained third neural network, to extract a fourth road feature map of multiple channels via the to-be-trained third neural network; and determining a road direction regression map according to the fourth road feature map of multiple channels;

inputting the remote sensing image sample or the road feature map of multiple channels of the remote sensing image sample into a to-be-trained fourth neural network, to extract a sixth road feature map of multiple channels via the to-be-trained fourth neural network; and determining a second road probability map according to the sixth road feature map of multiple channels; and separately returning the first loss between the road direction regression map and the road direction reference map, the second loss between the road probability map and the equal-width road reference map, and the third loss between the second road probability map and the equal-width road reference map to a neural network system comprising the third neural network, the second sub-neural network, and the fourth neural network, to jointly adjust network parameters of the neural network system.

In the embodiments, in addition to adjusting respectively the network parameters of the neural network systems of the third neural network, the second sub-neural network, and the fourth neural network through the first loss, the second loss, and the third loss, the network parameters of the neural network system comprising the third neural network, the second sub-neural network, and the fourth neural network may be also adjusted, so as to improve the accuracy of the road width and direction in the obtained road map.

In an optional example, the block 204 may be performed by a processor by invoking a corresponding instruction stored in a memory, or may be performed by a road map generation unit 704 run by the processor.

With continued reference to FIG. 6a, FIG. 6a is a schematic diagram of an application scenario of a method for generating a road map according to embodiments of the present disclosure. FIG. 6a is an actual remote sensing image. It may be seen that FIG. 6a includes information such as roads, buildings, and trees. In order to extract road information from the remote sensing image, the remote sensing image is firstly input into a first neural network to obtain first road feature information; then, the first road feature information of multiple channels is input into a third neural network to obtain third road feature information of multiple channels; and afterwards, the first road feature information and the third road feature information are fused, and a road map is generated according to a fusion result, as shown in FIG. 6b.

The methods provided by the embodiments of the present disclosure improve the accuracy of extracting the road width feature and the road direction feature for the remote sensing image.

Any method for generating a road map provided by the embodiments of the present disclosure is executed by any appropriate device having data processing capability, including, but not limited to, a terminal device, a server and the like. Alternatively, any method for generating a road map provided by the embodiments of the present disclosure is executed by a processor, for example, any method for generating a road map mentioned in the embodiments of the present disclosure is executed by the processor by invoking a corresponding instruction stored in a memory. Details are not described below again.

Persons of ordinary skill in the art may understand that all or some steps for implementing the foregoing method embodiments are achieved by a program by instructing related hardware; the foregoing program may be stored in a computer readable storage medium; when the program is executed, operations including the foregoing method embodiments are executed. Moreover, the foregoing storage medium includes various media capable of storing program codes such as ROM, RAM, a magnetic disk, or an optical disk.

With further reference to FIG. 7, as an implementation of the method shown in the abovementioned drawings, the embodiments of the present disclosure provide an apparatus for generating a road map. The embodiments of the apparatus for generating a road map correspond to the embodiments of the method shown in FIG. 2, and the apparatus may be applied to various electronic devices.

As shown in FIG. 7, the apparatus for generating a road map 700 according to the embodiments includes: a first road feature information acquisition unit 701, a third road feature information acquisition unit 702, an information fusion unit 703, and a road map generation unit 704. The first road feature information acquisition unit 701 is configured to input a remote sensing image into a first neural network, to extract first road feature information of multiple channels via the first neural network; the third road feature information acquisition unit 702 is configured to input the first road feature information of multiple channels into a third neural network, to extract third road feature information of multiple channels via the third neural network, where the third neural network is a neural network trained by using road direction information as supervision information; the information fusion unit 703 is configured to fuse the first road feature information and the third road feature information; and the road map generation unit 704 is configured to generate a road map according to a fusion result.

In some optional implementations of the embodiments, the information fusion unit 703 is configured to: perform addition or weighted addition on the first road feature information and the third road feature information; or concatenate the first road feature information and the third road feature information.

In some optional implementations of the embodiments, the first neural network includes: a second sub-neural network, where the second sub-neural network is a neural network trained by using allowable road width information as supervision information; the first road feature information acquisition unit 701 includes: a first acquisition sub-unit (not shown), configured to input the remote sensing image into the second sub-neural network, to extract the second road feature map of multiple channels via the second sub-neural network. Accordingly, in this implementation, the first road feature information includes the second road feature map.

In some optional implementations of the embodiments, the first neural network includes: a first sub-neural network and a second sub-neural network; the first road feature information acquisition unit 701 includes: a first acquisition subunit (not shown) and a second acquisition subunit (not shown). The first acquisition subunit is configured to input the remote sensing image into the first sub-neural network, to extract a first road feature map of multiple channels via the first sub-neural network; and the second acquisition subunit is configured to input the first road feature map of multiple channels into the second sub-neural network, to extract a second road feature map of multiple channels via the second sub-neural network, where the second sub-neural network is a neural network trained by using allowable road width information as supervision information. Accordingly, in this implementation, the first road feature information includes the second road feature map.

In some optional implementations of the embodiments, the first neural network includes: a first sub-neural network, a second sub-neural network, and a third sub-neural network; the first road feature information acquisition unit 701 includes: a first acquisition subunit (not shown), a second acquisition subunit (not shown), and a third acquisition subunit (not shown). The first acquisition subunit is configured to input the remote sensing image into the first sub-neural network, to extract a first road feature map of multiple channels via the first sub-neural network; the second acquisition subunit is configured to input the first road feature map of multiple channels into the second sub-neural network, to extract the second road feature map of multiple channels via the second sub-neural network, where the second sub-neural network is a neural network trained by using allowable road width information as supervision information; and the third acquisition subunit is configured to input the second road feature map of multiple channels into the third sub-neural network, to extract a third road feature map of multiple channels via the third sub-neural network. Accordingly, in this implementation, the first road feature information includes the third road feature map.

In some optional implementations of the embodiments, the allowable road width information may be an allowable road width range, and the width of each road in the road map falls into the allowable road width range; or the allowable road width information may also be a predetermined road width, and the width of each road in the road map is the predetermined road width.

In some optional implementations of the embodiments, the road map generation unit 704 includes: a fourth road feature information acquisition subunit (not shown) and a road map determination subunit (not shown). The fourth road feature information acquisition subunit is configured to input the fusion result into a fourth neural network, to extract fourth road feature information of multiple channels via the fourth neural network; and the road map determination subunit is configured to determine the road map based on the fourth road feature information of multiple channels.

In some optional implementations of the embodiments, the fourth neural network is a neural network trained by using allowable road width information as supervision information.

In some optional implementations of the embodiments, the road map generation unit 704 further includes: a centerline determination subunit (not shown), configured to determine a centerline of a road in the road map.

In some optional implementations of the embodiments, the road map generation unit 704 further includes: a road vector map acquisition subunit (not shown), configured to vectorize the road map to obtain a road vector map.

In some optional implementations of the embodiments, the apparatus further includes: a third neural network training unit (not shown), configured to: obtain a road direction reference map of a remote sensing image for training; input the remote sensing image for training or a road feature map of multiple channels of the remote sensing image for training into a to-be-trained third neural network, to extract a fourth road feature map of multiple channels via the to-be-trained third neural network; determine a road direction regression map according to the fourth road feature map of multiple channels; and return the first loss between the road direction regression map and the road direction reference map to the to-be-trained third neural network, to adjust network parameters of the to-be-trained third neural network.

In some optional implementations of the embodiments, the apparatus further includes: a second sub-neural network training unit (not shown), configured to: obtain an equal-width road reference map of a remote sensing image for training; input the remote sensing image for training or a road feature map of multiple channels of the remote sensing image for training into a to-be-trained second sub-neural network, to extract a fifth road feature map of multiple channels via the to-be-trained second sub-neural network; determine a first road probability map according to the fifth road feature map of multiple channels; and return the second loss between the first road probability map and the equal-width road reference map to the to-be-trained second sub-neural network, to adjust network parameters of the to-be-trained second sub-neural network.

In some optional implementations of the embodiments, the apparatus further includes: a fourth neural network training unit (not shown), configured to: obtain an equal-width road reference map of a remote sensing image for training; input the remote sensing image for training or a road feature map of multiple channels thereof into a to-be-trained fourth neural network, to extract a sixth road feature map of multiple channels via the to-be-trained fourth neural network; determine a second road probability map according to the sixth road feature map of multiple channels; and return the third loss between the second road probability map and the equal-width road reference map to the to-be-trained fourth neural network, to adjust network parameters of the to-be-trained fourth neural network.

In some optional implementations of the embodiments, the apparatus further includes: a second sub-neural network training unit, a third neural network training unit, and a fourth neural network training unit, where, the second sub-neural network training unit is configured to: obtain an equal-width road reference map of a remote sensing image for training; input the remote sensing image for training or a road feature map of multiple channels of the remote sensing image for training into a to-be-trained second sub-neural network, to extract a fifth road feature map of multiple channels via the to-be-trained second sub-neural network; determine a first road probability map according to the fifth road feature map of multiple channels; and return the second loss between the first road probability map and the equal-width road reference map to a neural network system comprising the third neural network, the second sub-neural network, and the fourth neural network;

the third neural network training unit is configured to: obtain a road direction reference map of a remote sensing image for training; input the remote sensing image for training or a road feature map of multiple channels of the remote sensing image for training into a to-be-trained third neural network, to extract a fourth road feature map of multiple channels via the to-be-trained third neural network; determine a road direction regression map according to the fourth road feature map of multiple channels; and return the first loss between the road direction regression map and the road direction reference map to a neural network system comprising the third neural network, the second sub-neural network, and the fourth neural network; and the fourth neural network training unit is configured to: obtain an equal-width road reference map of a remote sensing image for training; input the remote sensing image for training or a road feature map of multiple channels thereof into a to-be-trained fourth neural network, to extract a sixth road feature map of multiple channels via the to-be-trained fourth neural network; determine a second road probability map according to the sixth road feature map of multiple channels; and return the third loss between the second road probability map and the equal-width road reference map to a neural network system comprising the third neural network, the second sub-neural network, and the fourth neural network, so as to jointly combine the first loss and the second loss to adjust network parameters of the neural network system.

The embodiments of the present disclosure provide an electronic device, including: a memory, configured to store executable instructions; and a processor, configured to communicate with the memory to execute the executable instructions so as to complete operations of the method for generating a road map according to any one of the foregoing embodiment.

The embodiments of the present disclosure provide a non-transitory computer storage medium, configured to store computer-readable instructions, where the computer-readable instructions, when being executed by a processor, cause the processor to execute operations of the method for generating a road map according to any one of the foregoing embodiments.

The embodiments of the present disclosure provide a computer program, including a computer-readable code, where when the computer-readable code runs in a device, a processor in the device executes operations used for implementing the method for generating a road map according to any one of the foregoing embodiments.

Referring to FIG. 8 below, a schematic structural diagram of a server 800 suitable for implementing the embodiments of the present disclosure is shown.

As shown in FIG. 8, the server 800 includes a central processing unit (CPU) 801 that can perform various appropriate actions and processing in accordance with a program stored in a Read-Only Memory (ROM) 802 or a program loaded from a storage section 808 to a Random Access Memory (RAM) 803. In the RAM 803, programs and data required for the operations of the server 800 are also stored. The CPU 801, the ROM 802, and the RAM 803 are connected to each other via the bus 804. In the presence of the RAM 803, the ROM 802 is an optional module. The RAM 803 stores executable instructions, or writes the executable instructions to the ROM 802 during running; the executable instructions cause the CPU 801 to execute corresponding operations of the method for generating a road map according to any one of the foregoing embodiments. An Input/Output (I/O) interface 805 is also connected to the bus 804. The communication part 812 is integrated, or is configured to have multiple sub-modules (for example, multiple IB network cards) connected to the bus.

The following components are connected to the I/O interface 805: an input section 806 including a keyboard, a mouse, or the like; an output section 807 including a Liquid Crystal Display (LCD), a speaker, or the like; the storage section 808 including a hard disk, or the like; and a communication section 809 of a network interface card including an LAN card, a modem, or the like. The communication section 809 performs communication processing via a network such as the Internet. A drive 810 is also connected to the I/O interface 805 according to requirements. A removable medium 811 such as a magnetic disk, an optical disk, a magneto-optical disk, a semiconductor memory or the like is mounted on the drive 810 according to requirements, so that a computer program read from the removable medium is installed on the storage section 808 according to requirements.

Particularly, a process described above with reference to a flowchart according to the embodiments of the present disclosure is implemented as a computer software program. For example, the embodiments of the present disclosure include a computer program product, which includes a computer program tangibly contained in a machine-readable medium. The computer program includes a program code for executing the method for generating a road map according to the embodiment illustrated in the flowchart. In such embodiments, the computer program is downloaded and installed from the network through the communication section 809, and/or is installed from the removable medium 811.

The flowcharts and block diagrams in the accompanying drawings illustrate the architecture, functionality and operations of possible implementations of systems, methods, and computer program products according to various embodiments of the present disclosure. In this regard, each block in the flowchart of block diagrams may represent a portion of a module, program segment, or code, which includes one or more executable instructions for implementing the specified logical function(s). In some alternative implementations, it should also be noted that the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, may be implemented by special hardware-based systems that perform the specified functions or operations or carried out by combinations of special hardware and computer instructions.

The description of units involved in the embodiments of the present disclosure may be implemented by means of software or by means of hardware. The described units may also be provided in a processor, for example, described as: a processor including a first road feature information acquisition unit, a third road feature information acquisition unit, an information fusion unit, and a road map generation unit. The names of these units do not constitute a limitation on the units themselves under certain circumstances. For example, the road map generation unit may also be described as "a unit for obtaining a road map".

As another aspect, the embodiments of the present disclosure further provide a non-transitory computer storage medium. The non-transitory computer storage medium may be a non-transitory computer storage medium included in the apparatus in the aforementioned embodiments; or may be a non-transitory computer storage medium that exists alone and is not assembled into a terminal. The non-transitory computer storage medium stores one or more programs. When the one or more programs are executed by a device, the device is caused to: input a remote sensing image into a first neural network, to extract first road feature information of multiple channels via the first neural network; input the first road feature information of multiple channels into a third neural network, to extract third road feature information of multiple channels via the third neural network, where the third neural network is a neural network trained by using at least road direction information as supervision information; fuse the first road feature information and the third road feature information; and generate a road map according to a fusion result.

The foregoing is only a description of the optional embodiments of the present disclosure and the applied technical principles. It should be appreciated by those skilled in the art that scope of disclosure involved in the embodiments of the present disclosure is not limited to the technical solutions formed by the particular combinations of the above technical features, and should also cover other technical solutions formed by any combinations of the above technical features or equivalent features thereof, without departing from the abovementioned inventive concept, such as, technical solutions formed by mutual replacement of the features as disclosed in the embodiments of the present disclosure with (but not limited to) technical features having similar functions.

The invention claimed is:

1. A method for generating a road map, comprising:
inputting a remote sensing image into a first neural network to extract first road feature information of multiple channels via the first neural network, wherein the first neural network comprises a second sub-neural network, wherein the second sub-neural network is a neural network trained by using allowable road width information as supervision information;
inputting the first road feature information of multiple channels into a third neural network to extract third road feature information of multiple channels via the third neural network, wherein the third neural network is a neural network trained by using road direction information as supervision information;
fusing the first road feature information and the third road feature information;
generating a road map according to a fusion result;
determining a centerline of a road in the road map; and
vectorizing the road map to obtain a road vector map.

2. The method according to claim 1, wherein the fusing the first road feature information and the third road feature information comprises:
performing addition or weighted addition on the first road feature information and the third road feature information; or
concatenating the first road feature information and the third road feature information.

3. The method according to claim 1, wherein
the inputting a remote sensing image into a first neural network to extract first road feature information of multiple channels via the first neural network comprises:
inputting the remote sensing image into the second sub-neural network to extract a second road feature map of multiple channels via the second sub-neural network, wherein the first road feature information comprises the second road feature map.

4. The method according to claim 3, wherein the first neural network further comprises: a first sub-neural network;
the inputting the remote sensing image into the second sub-neural network to extract a second road feature map of multiple channels via the second sub-neural network comprises:
inputting the remote sensing image into the first sub-neural network to extract a first road feature map of multiple channels via the first sub-neural network; and
inputting the first road feature map of multiple channels into the second sub-neural network to extract the second road feature map of multiple channels via the second sub-neural network.

5. The method according to claim 3, wherein the first neural network further comprises: a third sub-neural network;
after the extracting a second road feature map of multiple channels via the second sub-neural network, the method further comprises:
inputting the second road feature map of multiple channels into the third sub-neural network to extract a third road feature map of multiple channels via the third sub-neural network, wherein the first road feature information comprises the third road feature map.

6. The method according to claim 3, wherein the allowable road width information comprises: an allowable road width range, and the width of at least one road in the road map falls into the allowable road width range; or
the allowable road width information comprises: a predetermined road width, and the width of at least one road in the road map is the predetermined road width.

7. The method according to claim 1, wherein the generating a road map according to a fusion result comprises:
inputting the fusion result into a fourth neural network to extract fourth road feature information of multiple channels via the fourth neural network; and
determining the road map based on the fourth road feature information of multiple channels.

8. The method according to claim 7, wherein the fourth neural network is a neural network trained by using allowable road width information as supervision information.

9. The method according to claim 1, further comprising:
obtaining a road direction reference map of a remote sensing image sample;
inputting the remote sensing image sample or a road feature map of multiple channels of the remote sensing image sample into a to-be-trained third neural network, to extract a fourth road feature map of multiple channels via the to-be-trained third neural network;
determining a road direction regression map according to the fourth road feature map of multiple channels; and
returning the first loss between the road direction regression map and the road direction reference map to the to-be-trained third neural network to adjust network parameters of the to-be-trained third neural network.

10. The method according to claim 3, further comprising:
obtaining an equal-width road reference map of a remote sensing image sample;
inputting the remote sensing image sample or a road feature map of multiple channels of the remote sensing image sample into a to-be-trained second sub-neural network to extract a fifth road feature map of multiple channels via the to-be-trained second sub-neural network;
determining a first road probability map according to the fifth road feature map of multiple channels; and
returning the second loss between the first road probability map and the equal-width road reference map to the to-be-trained second sub-neural network, to adjust network parameters of the to-be-trained second sub-neural network.

11. The method according to claim 7, further comprising:
obtaining an equal-width road reference map of a remote sensing image sample;
inputting the remote sensing image sample or a road feature map of multiple channels of the remote sensing image sample into a to-be-trained fourth neural network, to extract a sixth road feature map of multiple channels via the to-be-trained fourth neural network;
determining a second road probability map according to the sixth road feature map of multiple channels; and
returning the third loss between the second road probability map and the equal-width road reference map to the to-be-trained fourth neural network to adjust network parameters of the to-be-trained fourth neural network.

12. The method according to claim 7, further comprising:
obtaining an equal-width road reference map and a road direction reference map of a remote sensing image sample; inputting the remote sensing image sample or a road feature map of multiple channels of the remote sensing image sample into a to-be-trained second sub-neural network to extract a fifth road feature map of multiple channels via the to-be-trained second sub-neural network; and determining a first road probability map according to the fifth road feature map of multiple channels;
inputting the remote sensing image sample or the road feature map of multiple channels of the remote sensing image sample into a to-be-trained third neural network, to extract a fourth road feature map of multiple channels via the to-be-trained third neural network; and determining a road direction regression map according to the fourth road feature map of multiple channels;
inputting the remote sensing image sample or the road feature map of multiple channels of the remote sensing image sample into a to-be-trained fourth neural network to extract a sixth road feature map of multiple channels via the to-be-trained fourth neural network; and determining a second road probability map according to the sixth road feature map of multiple channels; and
separately returning the first loss between the road direction regression map and the road direction reference map, the second loss between the road probability map and the equal-width road reference map, and the third loss between the second road probability map and the equal-width road reference map to a neural network system comprising the third neural network, the second sub-neural network, and the fourth neural network, to jointly adjust network parameters of the neural network system.

13. An apparatus for generating a road map, comprising:
a processor; and
a memory for storing instructions executable by the processor;
wherein the processor is configured to:
input a remote sensing image into a first neural network to extract first road feature information of multiple channels via the first neural network, wherein the first neural network comprises a second sub-neural network, wherein the second sub-neural network is a neural network trained by using allowable road width information as supervision information;
input the first road feature information of multiple channels into a third neural network to extract third road feature information of multiple channels via the third neural network, wherein the third neural network is a neural network trained by using road direction information as supervision information;
fuse the first road feature information and the third road feature information;
generate a road map according to a fusion result;
determine a centerline of a road in the road map; and
vectorize the road map to obtain a road vector map.

14. The apparatus according to claim 13, wherein the processor is further configured to:
input the remote sensing image into the second sub-neural network, to extract a second road feature map of multiple channels via the second sub-neural network, wherein the first road feature information comprises the second road feature map.

15. The apparatus according to claim 14, wherein the first neural network further comprises: a first sub-neural network;
the processor is further configured to:
input the remote sensing image into the first sub-neural network to extract a first road feature map of multiple channels via the first sub-neural network; and
input the first road feature map of multiple channels into the second sub-neural network to extract the second road feature map of multiple channels via the second sub-neural network.

16. The apparatus according to claim 14, wherein the first neural network further comprises: a third sub-neural network;
the processor is further configured to:
input the second road feature map of multiple channels into the third sub-neural network to extract a third road feature map of multiple channels via the third sub-neural network, wherein the first road feature information comprises the third road feature map.

17. The apparatus according to claim 14, wherein:
the allowable road width information comprises: an allowable road width range, and the width of at least one road in the road map falls into the allowable road width range; or
the allowable road width information comprises: a predetermined road width, and the width of at least one road in the road map is the predetermined road width.

18. A non-transitory computer storage medium, having stored thereon computer-readable instructions that, when being executed by a processor, cause the processor to execute the following:
inputting a remote sensing image into a first neural network to extract first road feature information of multiple channels via the first neural network, wherein the first neural network comprises a second sub-neural network, wherein the second sub-neural network is a neural network trained by using allowable road width information as supervision information;
inputting the first road feature information of multiple channels into a third neural network to extract third road feature information of multiple channels via the third neural network, wherein the third neural network is a neural network trained by using road direction information as supervision information;
fusing the first road feature information and the third road feature information;
generating a road map according to a fusion result;
determining a centerline of a road in the road map; and
vectorizing the road map to obtain a road vector map.

* * * * *